· US009185027B2

United States Patent
Beheshti-Zavareh et al.

(10) Patent No.: US 9,185,027 B2
(45) Date of Patent: Nov. 10, 2015

(54) METHOD AND APPARATUS FOR RESILIENT ROUTING OF CONTROL TRAFFIC IN A SPLIT-ARCHITECTURE SYSTEM

(75) Inventors: Neda Beheshti-Zavareh, San Jose, CA (US); Ying Zhang, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 769 days.

(21) Appl. No.: 13/294,559

(22) Filed: Nov. 11, 2011

(65) Prior Publication Data

US 2013/0028070 A1 Jan. 31, 2013

Related U.S. Application Data

(60) Provisional application No. 61/513,140, filed on Jul. 29, 2011.

(51) Int. Cl.
- H04L 12/28 (2006.01)
- H04L 12/753 (2013.01)
- H04L 12/707 (2013.01)
- H04L 12/703 (2013.01)
- H04L 12/721 (2013.01)

(52) U.S. Cl.
CPC ............. H04L 45/48 (2013.01); H04L 45/22 (2013.01); H04L 45/28 (2013.01); H04L 45/12 (2013.01); H04L 45/24 (2013.01)

(58) Field of Classification Search
None
See application file for complete search history.

(56) References Cited

U.S. PATENT DOCUMENTS

| 5,898,843 A | 4/1999 | Crump et al. |
| 6,865,609 B1 | 3/2005 | Gubbi et al. |
| 6,928,484 B1 * | 8/2005 | Huai et al. .................. 709/239 |
| 7,366,113 B1 * | 4/2008 | Chandra et al. ............. 370/255 |
| 7,366,989 B2 | 4/2008 | Naik et al. |
| 7,415,211 B2 | 8/2008 | Feinberg et al. |
| 7,911,978 B1 * | 3/2011 | Chandra et al. ............. 370/255 |
| 8,018,860 B1 | 9/2011 | Cook |
| 8,255,660 B1 | 8/2012 | Chatterjee et al. |
| 8,274,989 B1 | 9/2012 | Allan et al. |
| 8,311,014 B2 | 11/2012 | Valluri et al. |
| 8,351,456 B2 | 1/2013 | Kadous et al. |
| 8,364,515 B1 | 1/2013 | Procopiuc |

(Continued)

OTHER PUBLICATIONS

Zhang Y. et al., "On Resilience of Split-Archit'ecture'Networks", Global Telecommunications Conference 2011, IEEE, Dec. 5, 2011, pp. 1-6.*

(Continued)

Primary Examiner — Marsha D Banks Harold
Assistant Examiner — Christopher Wyllie

(57) ABSTRACT

The invention is a routing algorithm characteristic that minimizes the weight, meaning that the probability that a node is disconnected from the controller in case of a failure in the network is minimized. The first algorithm used in the invention is an approximation algorithm for finding the controller routing tree that provides maximum resilience in the network. The algorithm is referred to herein as the Maximum Resilience (MR) algorithm. The heuristic MR algorithm selects a shortest-path tree as a starting point and modifies the tree in order to improve resilience. The output of the MR algorithm is not necessarily a shortest-path tree, but provides more resilience compared to the initial tree. The RASP algorithm provides a shortest-path tree with improved network resilience compared to other possible shortest-path trees.

15 Claims, 7 Drawing Sheets

(56) References Cited

U.S. PATENT DOCUMENTS

| | | | |
|---|---|---|---|
| 8,559,314 B2* | 10/2013 | Yedavalli et al. | 370/238 |
| 8,593,958 B2* | 11/2013 | Zhang | 370/230.1 |
| 8,804,490 B2* | 8/2014 | Tatipamula et al. | 370/218 |
| 8,976,673 B2* | 3/2015 | Yedavalli et al. | 370/238 |
| 9,059,928 B2* | 6/2015 | Beheshti-Zavareh et al. | 1/1 |
| 2002/0042274 A1 | 4/2002 | Ades | |
| 2002/0067693 A1 | 6/2002 | Kodialam et al. | |
| 2002/0187770 A1 | 12/2002 | Grover et al. | |
| 2003/0009598 A1 | 1/2003 | Gunluk et al. | |
| 2003/0218989 A1 | 11/2003 | El-Amawy et al. | |
| 2004/0179471 A1 | 9/2004 | Mekkittikul et al. | |
| 2004/0218582 A1* | 11/2004 | Kennedy et al. | 370/351 |
| 2005/0060319 A1 | 3/2005 | Douglas et al. | |
| 2005/0083844 A1* | 4/2005 | Zhu et al. | 370/230.1 |
| 2005/0243711 A1* | 11/2005 | Alicherry et al. | 370/216 |
| 2006/0092935 A1 | 5/2006 | Lakshman et al. | |
| 2006/0104199 A1 | 5/2006 | Katukam et al. | |
| 2006/0126654 A1* | 6/2006 | Nilakantan et al. | 370/437 |
| 2006/0153067 A1 | 7/2006 | Vasseur et al. | |
| 2006/0215666 A1 | 9/2006 | Shepherd et al. | |
| 2006/0291473 A1 | 12/2006 | Chase et al. | |
| 2007/0070909 A1* | 3/2007 | Reeve | 370/238 |
| 2007/0086332 A1 | 4/2007 | Way et al. | |
| 2007/0286218 A1 | 12/2007 | Zhang et al. | |
| 2009/0013091 A1 | 1/2009 | Zhang et al. | |
| 2009/0168768 A1 | 7/2009 | Chiabaut et al. | |
| 2009/0276666 A1 | 11/2009 | Haley et al. | |
| 2010/0142370 A1 | 6/2010 | Pan et al. | |
| 2010/0157794 A1 | 6/2010 | Nakash | |
| 2010/0290396 A1 | 11/2010 | Karunakaran et al. | |
| 2010/0332991 A1* | 12/2010 | Banerjee et al. | 715/736 |
| 2011/0274035 A1 | 11/2011 | Yadav et al. | |
| 2011/0274037 A1 | 11/2011 | Jain et al. | |
| 2011/0280213 A1 | 11/2011 | Calhoun et al. | |
| 2011/0280568 A1 | 11/2011 | Dvir et al. | |
| 2011/0286396 A1 | 11/2011 | Kato et al. | |
| 2011/0289137 A1* | 11/2011 | Ittah et al. | 709/203 |
| 2012/0096085 A1* | 4/2012 | Yoon et al. | 709/204 |
| 2012/0110393 A1 | 5/2012 | Shieh et al. | |
| 2012/0195319 A1 | 8/2012 | Bragg et al. | |
| 2012/0224588 A1 | 9/2012 | Germain et al. | |
| 2012/0230199 A1 | 9/2012 | Chiabaut | |
| 2012/0263185 A1 | 10/2012 | Bejerano et al. | |
| 2012/0303835 A1 | 11/2012 | Kempf et al. | |
| 2012/0317058 A1 | 12/2012 | Abhulimen | |
| 2013/0028070 A1* | 1/2013 | Beheshti-Zavareh et al. | 370/217 |
| 2013/0028073 A1* | 1/2013 | Tatipamula et al. | 370/218 |
| 2013/0176859 A1 | 7/2013 | Stanislaus et al. | |
| 2013/0215769 A1* | 8/2013 | Beheshti-Zavareh et al. | 370/252 |
| 2013/0346545 A1 | 12/2013 | Petersen et al. | |
| 2014/0016477 A1* | 1/2014 | Yedavalli et al. | 370/238 |

OTHER PUBLICATIONS

McKeown N. et al., "Openflow: Enabling Innovation in Campus Networks", Mar. 14, 2008, pp. 1-6.

OpenFlow Switch Specification, Version 1.1.0 (Wire Protocol 0x02), Oct. 23, 2010, http://openflow.org/documents/openflow1.1-allmerged-draft.pdf, the whole document.

Kin-Wah et al. "On the Feasibility and Efficacy of Protection Routing in IP Networks", University of Pennsylvania, Technical Report, Dec. 10, 2009, the whole document.

Beheshti N. et al., "Fast Failover for Control Traffic in Software-defined Networks", Global Communications Conference, Globecom 2012, IEEE; Dec. 3, 2012; pp. 2665-2670.

Zhang Y. et al., "On Resilience of Split-Architecture Networks", Global Telecommunications Conference 2011, IEEE, Dec. 5, 2011, pp. 1-6.

* cited by examiner

○ UNPROTECTED
□ CONTROLLER
—— ROUTING TREE
------ EDGES OR LINKS

METHOD AND APPARATUS FOR RESILIENT ROUTING OF CONTROL TRAFFIC IN A SPLIT-ARCHITECTURE SYSTEM

CROSS REFERENCE TO RELATED APPLICATION

The present application relates to U.S. patent application Ser. No. 13/236,296, filed on Sep. 19, 2011, and claims priority from U.S. Provisional Patent Application No. 61/513,140, filed on Jul. 29, 2011.

FIELD OF THE INVENTION

The embodiments of the invention are related to the organization and design of networks. Specifically, the embodiments of the invention relate to a method and system for calculating, generating, implementing and using control traffic routing trees in a split architecture network. The algorithms disclosed herein take into account distance and resilience factors. The objective of the invention is to form a controller routing tree with short distance as well as high resilience in the connection between each switch and the controller within a network topology. The term "edges" and "links" are used interchangeably herein and refer to the network path interconnecting nodes.

BACKGROUND

In a conventional network architecture, there is a coupling of the forwarding and control planes in that both control and data packets are transmitted on the same link, hence the control traffic and data traffic is equally affected when a failure occurs. To simplify, control traffic is the traffic between a network element, referred to herein as a controller, that controls how flows of data are to be processed and forwarded and a forwarding element, referred to herein as a switch. Data traffic is the data payload that is sought to be transferred from one node to another node in a network. Throughout this application, forwarding element(s) are referred to as switch(es). However, the use of the term switch shall not be construed to limit such forwarding elements to Ethernet or layer 2 switches.

This coupling of the forwarding and control planes in a conventional network architecture usually results in an overly complicated control plane and complex network management. Disadvantageously, this is known to create a large burden and high barrier to new protocols and technology developments. Despite the rapid improvement in line speeds, port densities, and performance, the network control plane mechanisms have advanced at a much slower pace than the forwarding plane mechanisms. To overcome the cited disadvantages, the OpenFlow split architecture protocol has been developed.

A split-architecture network design introduces a separation between the control and forwarding components of a network. Among the use cases of such architecture are the access/aggregation domain of carrier-grade networks, enterprise networks, Internet service provider (ISP) networks, mobile backhaul networks, cloud computing, multilayer (L3 & L2 & L1, OTN, WDM) support networks and data centers, all of which are among the main building blocks of a network architecture. Therefore, proper design, management and performance optimization of these networks are of great importance.

Unlike the conventional network architecture which integrates both the forwarding and the control planes in the same network element, a split architecture network decouples these two planes and executes the control plane on servers that might be in different physical locations from the forwarding elements. The use of a split architecture in a network enables the simplification of the switches implementing the forwarding plane and shifts the intelligence of the network into a number of controllers that oversee the switches. The control traffic (sent as, e.g., flow entries, packets, frames, segments, protocol data units) in split-architecture networks can be transmitted on different paths from the data traffic (sent as, e.g., packets, frames, segments, protocol data units) or even on a separate network. Therefore, the reliability of the control plane in these networks is no longer directly linked with that of the forwarding plane. However, disconnection between the control plane and the forwarding plane in the split architecture could disable the forwarding plane; when a switch is disconnected from its controller, it cannot receive any instructions on how to forward new flows, and becomes practically offline.

In a split architecture network, the controller collects information from switches, and computes and distributes the appropriate forwarding decisions to the switches. Controllers and switches use a protocol to communicate and exchange information. An example of such protocol is OpenFlow (see www.openflow.org), which provides an open and standard method for communication between a switch and a controller, and it has drawn significant interest from both academics and industry.

FIG. 1 is a diagram 100 showing an overview of the OpenFlow interface between a switch 109 and a controller 101. Switch 109 is a component of network elements 105. Controller 101 communicates with switch 109 over secure channel 103 using the OpenFlow protocol. The flow or forwarding table 107 in an OpenFlow switch is populated with entries from controller 101, as seen in FIG. 2 consisting of: a rule 201 defining matches for fields in packet headers; an action 203 associated to the flow match 204; and a collection of statistics 205 on the flow 206.

When an incoming packet matches a particular rule, the associated actions are performed on the packet. As seen in FIG. 2, a rule 201 contains key fields 202 from several headers in the protocol stack, for example Ethernet MAC addresses, IP address, IP protocol, TCP/UDP port numbers as well as the incoming port number. To define a flow, all the available matching fields may be used. But it is also possible to restrict the matching rule to a subset of the available fields by using wildcards for the unwanted fields.

The de-coupled control platform of the split architecture eases the task of modifying the network control logic and provides a programmatic interface upon which developers can build a wide variety of new protocols and management applications. In this model, the data and control planes can evolve and scale independently, while the cost of the data plane elements is reduced.

It is well known that link and switch failures can adversely affect network performance. For example, a failure of a few milliseconds may easily result in terabyte data losses on high-speed edges. Studies of the resilience of networks have historically assumed an in-band control model, meaning that the control plane and data plane have the same resilience properties. Although split-architecture networks use an out-of-band model, link and switch failures are still a concern as a single controller is directly coupled by a link to each network element acting as a switch. In such a network, if the link between the controller and switch fails, the switch is unable to update its forwarding table and eventually fails.

In conventional networks, where both control and data packets are transmitted on the same link, the control and data information are equally affected when a failure happens. When used in a split architecture, disconnection between the controller and the forwarding plane could disable the forwarding plane as when a switch is disconnected from its controller, it cannot receive any instructions on how to forward new flows, and becomes practically offline.

In the existing split-architecture network design proposals and preliminary implementations, each switch is pre-programmed with a path to reach the controller. Upon a link or node failure, the switch relies on the controller to detect such failure and re-compute the new path for the switch. Detection of any failures in switches or links by the controller must be based on some implicit mechanisms, such as when Hello messages are not received by the controller from a switch. This introduces large delays in the network for detecting the exact location of the failure and re-establishing the controller-switch connections. If no backup path can be configured for a switch, then the connection of the switch to the controller will be interrupted in case of a failure in the primary path to the controller.

A link failure can occur over a link transporting control traffic, data traffic or both and it indicates that traffic traversing a link can no longer be transferred over the link. The failure can be either of a link between two switches or of a link between one controller and the switch to which it connects. In most cases, these links fail independently.

A switch failure indicates that a network element or forwarding element is unable to originate, respond, or forward any packet or other protocol data unit. Switch failures can be caused by software bugs, hardware failures, misconfigurations, and similar issues. In most cases, these switches fail independently.

Special failure cases include connectivity loss between a switch and a controller: A switch can lose connectivity to its controller due to failures on the intermediate links or nodes along the path between the switch and the controller. Whenever a switch cannot communicate with its assigned controller, the switch will discard all the packets on the forwarding plane managed by the controller, even though the path on the forwarding plane is still valid. In other embodiments, a subset of the traffic can be forwarded on forwarding plane or similar limited functionality can continue for a limited amount of time until a connection with an assigned controller or another controller is re-established. Therefore, this can be considered as a special case of switch failure.

For the most part, controllers and switches are tasked with minimizing the distance between nodes using a routing protocol such as Open Shortest Path First (OSPF). OSPF is currently the most popular interior gateway routing protocol. OSPF (see IETF RFC 2328) is a link-state protocol in which a router broadcasts its neighbors' link-state information to all the nodes in the routing domain. Using this information every router constructs the topology map of the entire network in the domain. Each router maintains a link-state database which reflects the entire network topology. Based on this topology map and the link cost metrics, the routers determine the shortest paths to all other routers using Dijkstra's algorithm. This information is in turn used to create routing tables that are used for forwarding of IP packets.

The primary disadvantage of using a shortest-path routing protocol is that it does not consider network resilience or protection. In evaluating a network design, network resilience is an important factor, as a failure of a few milliseconds may easily result in terabyte data losses on high-speed links. As used herein resilience is the ability to provide and maintain an acceptable level of service in the face of faults and challenges to normal operation. A network element or forwarding element that has greater resilience is better protected from faults and challenges to normal operation than a network element of forwarding element that has lesser resilience. As used herein failure probability is the frequency with which an engineered system or component fails, expressed as the number of failures per hour, or the probability of each node fails in the long time.

What is desired is a method and apparatus that that generates a controller routing tree based on resilience or protection factors and provides back-up links between a switch and a controller. Such desired controller routing tree would be generated in a controller based on information communicated between the switch and controller, used to configure secondary outgoing links in a switch to serve as backup paths between the switch and controller, the switch operable to detect a link or node failure and cause a back-up path from the switch to the controller to be selected.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
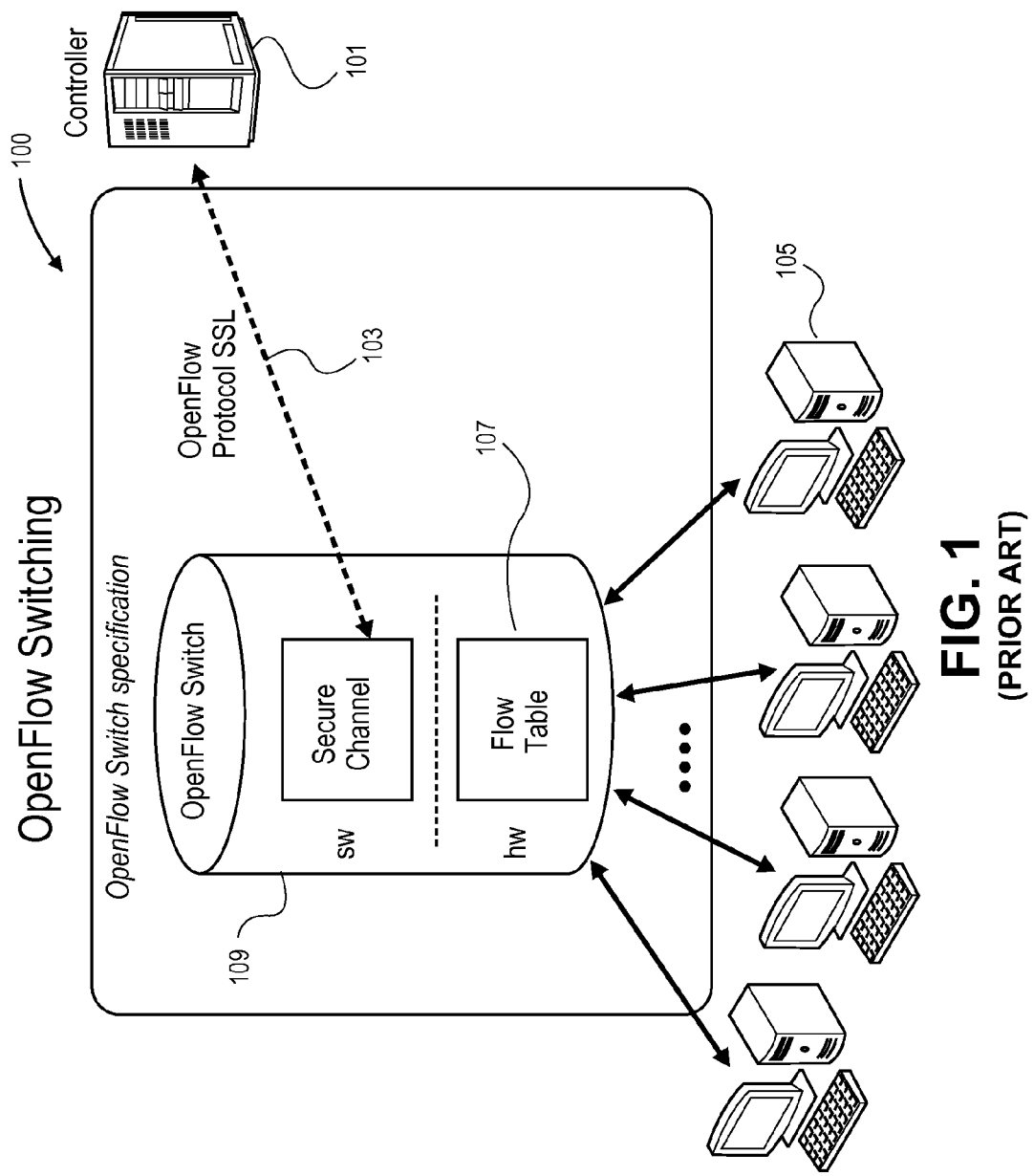
FIG. 1 is a diagram of a simple OpenFlow network.
Figure 2:
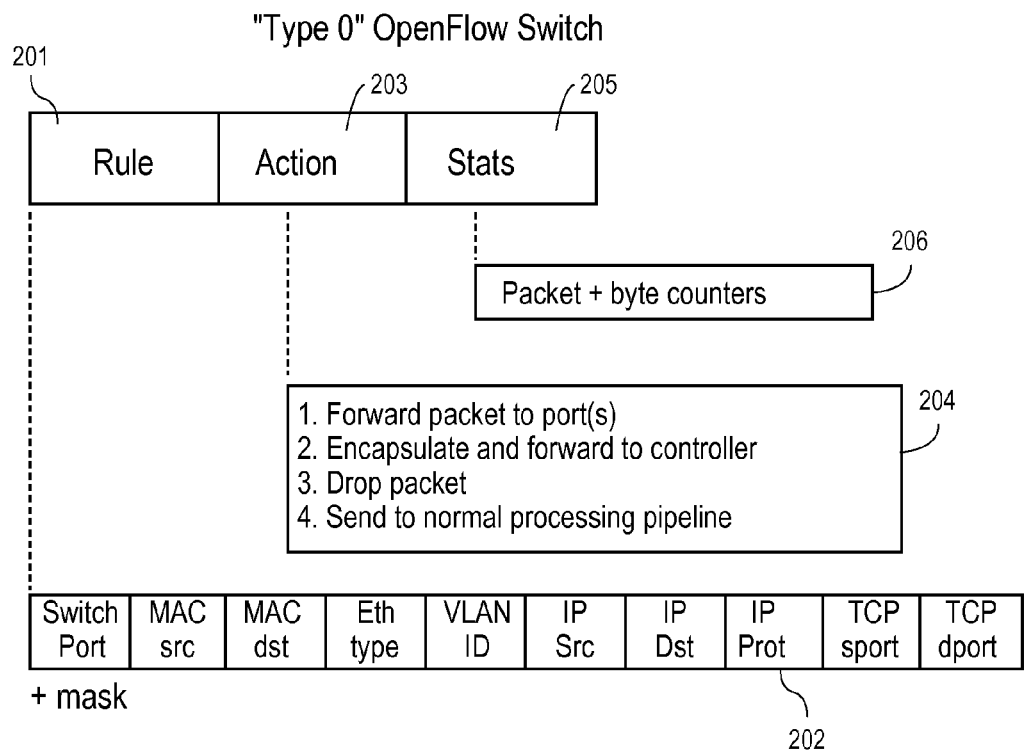
FIG. 2 is a diagram of the contents of a flow table entry.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures and the claimed network topology design system can be implemented using code, instructions and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more microprocessors coupled to one or more other components, such as one or more storage devices, user input/output devices (e.g., a keyboard, a touch screen, and/or a display), and network connections. The coupling of the set of microprocessors and other components is typically through one or more busses and bridges (also termed as bus controllers). The storage devices within the network topology design system represent one or more non-transitory machine-readable or computer-readable storage media and non-transitory machine-readable or computer-readable communication media. Thus, the non-transitory machine-readable or computer-readable storage media of a given electronic device or network topology design system typically stores code, instructions and/or data for execution on the set of one or more processors of that electronic device. Of course, one or more parts of an embodiment of the invention may be implemented using different combinations of software, firmware, and/or hardware.

As used herein, a network element or forwarding element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

The invention comprises a method and apparatus for determining the controller routing tree for routing control traffic in a split architecture system having a controller and a plurality of switches, using one of the disclosed algorithms to construct the controller routing tree for communication between the controller and switch. Whereas conventional routing algorithms proposed for use in a split architecture system only have the objective of minimizing the distance between the switch and controller, this invention considers both distance and resilience factors.

More specifically, the invention uses one of the disclosed algorithms for determining, by a controller, a controller routing tree that is then communicated to the switches of the split architecture system. The controller routing tree represents a non-load balanced control traffic path between each switch and the controller, the control traffic representing bi-directional information from each switch to the controller and forwarding decision information from the controller to the switch. The controller is in the same physical network as the switches. That is, the existing infrastructure of the split architecture network (existing links and switches) is used to connect the controller to all the switches in the network, as opposed to using a separate infrastructure to connect the control and forwarding planes. In other embodiments, a separate network infrastructure is used for communication or any combination thereof. Each algorithm has a different objective with respect to resilience and distance. The objective of the invention is the generation of controller routing trees that have a desired combination of resilience and distance in the connection between the switches and the controller.

The invention differs from the invention in Applicants' co-pending U.S. patent application Ser. No. 13/236,296 in that the invention disclosed in the co-pending application is directed to controller placement and assumes the use of shortest-path-tree routing. This invention is directed to the determination of a controller routing tree using a disclosed algorithm when controller location is fixed.

This invention extends the Applicants' invention in co-pending U.S. patent application Ser. No. 13/236,296 which places the controller of a split architecture area in a location selected to optimize the connection resilience between the controller and the switches in that area. As in such co-pending application, no assumptions on how the partitioning of the split-architecture areas are made. The partitioning, if any, can be based on any arbitrary metrics such as geographical constraints.

Further, in Applicants' co-pending U.S. patent application Ser. No. 13/236,296, Applicant discloses a pre-configuration of a backup path in each switch, so that if the primary outgoing link to the immediate upstream node does not work properly, a secondary outgoing link could be used as a backup path. With such protection scheme, when a switch detects a failure in its outgoing link or its immediate upstream node, it immediately changes its route to the controller, and uses the backup path, i.e., outgoing interface, pre-programmed in the switch to reconnect to the controller. This takes place without a need to involve the controller and without any effects on the rest of the routes in the network and on the connections of the downstream nodes to the controller. In other words, there will only be a local change in the outgoing interface of the affected switch. All other connections in the network will remain intact. If no backup path exists, then the connection between the switch to the controller will be interrupted in case of a failure in the primary path to the controller.

Figure 3:
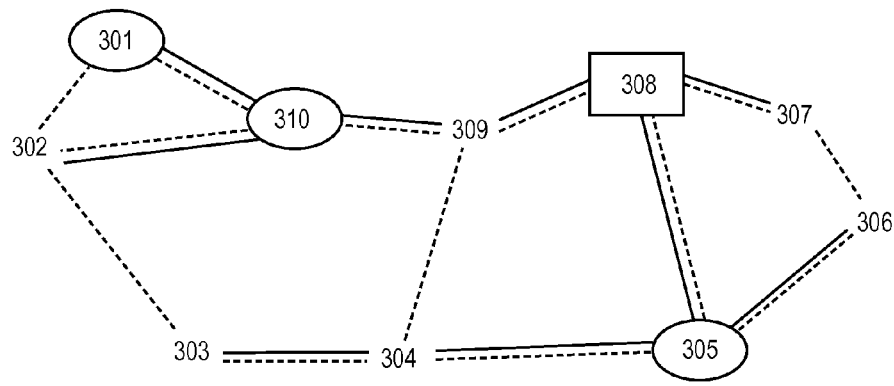
FIG. 3 is a graph illustrating a routing tree generated using an Open Shortest Path First algorithm.
Figure 4:
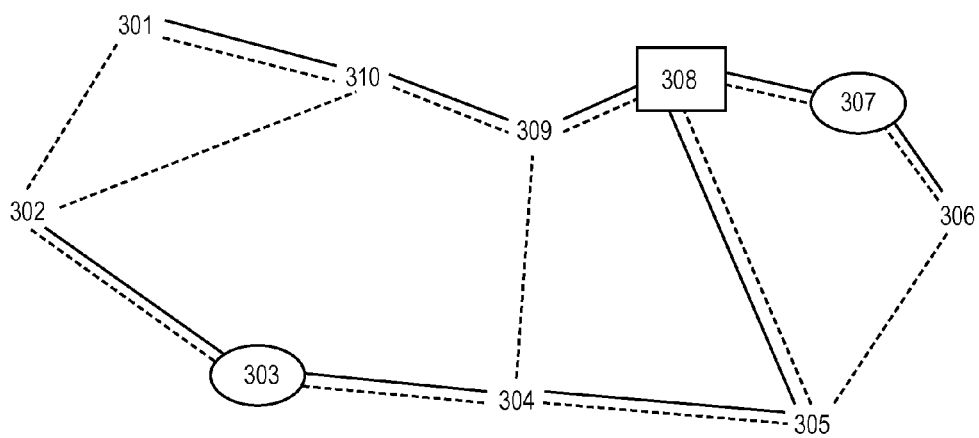
FIG. 4 is a graph illustrating a routing tree generated using a greedy routing algorithm.

The selected routing algorithm for determining the controller routing tree used to control traffic in the split architecture significantly impacts the resilience of the connection between the controller and the switches. Resilience can be illustrated with reference to FIGS. 3 and 4. As seen in FIG. 3, with node 308 as the controller, the shortest-path-based tree has 3 unprotected nodes 301, 310 and 305 as further defined herein. The improved routing tree of FIG. 4 using a greedy tree algorithm, has 2 unprotected nodes, 303 and 307. As can be seen, if the objective is to maximize the resilience, then the shortest-path tree as seen in FIG. 3 is not always the best choice as the controller routing tree.

In a split architecture system, a more resilient network will have a greater number of switches with backup paths, the most resilient network being one in which each and every switch has a pre-configured backup path to the controller. The resilient or protection metric can be described as follows: Denote a network with the graph $G=(V, E)$, where V the set of nodes in the network, and E is the set of bidirectional links between nodes. A cost is associated with each link in the network. Based on assigned link costs, shortest-path routes are calculated between any two nodes in the network. It is assumed that the cost on each link applies to both directions of the link. With this given topology, assume that one of the nodes is the controller and the rest of the nodes are the switches. Also assume that there is no load balancing on the control traffic sent between the switches and the controller. Therefore, each node has only one path to reach the controller. In other words, the control traffic is sent to and from the controller over a tree, rooted at the controller node. This node is referred to as the controller routing tree. This controller routing tree covers all the nodes in the network and is a subset of the links. Further assume that the same routing tree will be used for communications between the controller and the switches in both directions.

With a given, fixed controller location within the network, different routing algorithms can be used to form different routing trees whereby each node sends control traffic to the controller. In the controller routing tree T, node u is an upstream node of node v if there is a path in T from node v to node u towards the controller. Node u is called a downstream node of node v if there is a path in T from node u to node v towards the controller. In the controller routing tree, a node's parent is its immediate upstream node and a node's children are its immediate downstream nodes, upstream and downstream being determined after an initial controller routing tree is generated.

With a given, fixed controller location and controller routing tree T, consider node a and its immediate upstream node b. Node a is protected against the failure of its outgoing link (a, b) if there exists node c∈V\{a, b}, read as node c is an element of V but not including nodes a and b, that meet the following conditions:

Condition 1: Link (a, c) is in G (i.e., there is a link between nodes a and c in the network).

Condition 2: Node c is not a downstream node of node a in T.

The second condition guarantees that a loop will not be created as a result of connecting node a to node c.

If the above conditions are met, then link (a,c) could be assigned as the backup link for link (a, b), and this backup link could be generated in the controller and communicated to and pre-configured in node a. As soon as node a detects a failure in link (a, b), it will immediately change its route to the controller by changing the primary outgoing link (a, b) to the secondary outgoing link (a, c).

Node a is also protected against the failure of its immediate upstream node, if node c satisfies a third condition in addition to the two above conditions:

Condition 3: Node c is not a downstream node of node b in T.

The third condition guarantees that the control traffic of node c towards the controller will not pass through node b which is assumed to have failed. Again, as soon as node a detects a failure in node b, it switches its outgoing link from (a, b) to (a, c).

Depending on how critical or frequent link failures are versus node failures in the network, a network operator could assign different costs to these two kinds of failures, e.g., cost $\alpha$ for node failure and cost $\beta$ for link failure. For example, $\alpha=\beta$ could be interpreted and used for scenarios where link and node failures are equally likely or when it is equally important to protect the network against both kinds of failures. This way, the cost of not having protection at a node could be evaluated at $\alpha+\beta$ if the node is not protected at all, at $\alpha$ if it is protected only against its outgoing link failure, and at zero if it is protected against the upstream node failure as well. Of course, for switches directly connected to the controller, the upstream node protection is not defined as the immediate upstream node is the controller. Hence, for nodes directly connected to the controller, the assigned cost is zero if they are protected against their outgoing link failure, and is $\alpha+\beta$ otherwise.

The invention is thus a method implemented by a network topology design system operable, e.g., in the controller, to determine a controller routing tree T' for use within a split architecture network that establishes by the network topology design system, one of the nodes in V as the controller for G and establishes by the network topology design system the remainder of the nodes as switches. The network topology design system then graphs all possible distances to the controller from each switch and filters all of the possible distances to determine a shortest-path to the controller for each such switch, the cumulative shortest-paths from each switch to the controller being a shortest-path tree T for the controller, The shortest-path tree T is stored in a non-transitory machine-readable or computer-readable storage media. Based on the shortest-path to the controller for each switch, all immediate neighbor nodes of such switch are designated as either upstream or downstream. Then, commencing with the switch(es) that are neighbors to the controller and traversing to each immediate downstream switch until all of the switches in G are processed, the network topology design system determines and assigns a weight for each switch. Based on the weight of each switch, the shortest-path tree T is modified to obtain a modified shortest-path tree T' with improved resilience and is stored in the non-transitory machine-readable or computer-readable storage media. The path, including back-up paths, if any, are then communicated form the controller to each switch to which it correlates. In the event of a link or node failure between the controller and the switch, the switch can then move its outgoing link from the primary outgoing link to the secondary outgoing link.

If conventional management tools are deployed in the split-architecture network, meaning there are no extended signaling mechanism for a node to inform its downstream nodes of a failure, then if a switch is disconnected from the controller, i.e., if there is no backup path programmed in the switch, all its downstream nodes will also be disconnected, even if the downstream nodes are locally protected against failures in their outgoing links or immediate upstream nodes. This means that in evaluating networks resiliency, in addition to providing a weight to a node based on the extent of alternative links, more weight should be assigned to nodes closer to the controller. Recall that the controller is the root of the controller routing tree. More precisely, the weight of each node should be proportional to the number of its downstream nodes.

Hence, the weight of a node is based on the number of its downstream nodes scaled by a cost factor associated with the node's protection status, which is 0, if the node is protected against both its outgoing link and its immediate upstream node failures; $\alpha$, if the node is only protected against its outgoing link failure, otherwise $\alpha+\beta$.

Further, the weight of a routing tree is can be defined as the sum of the weights of all its nodes. This weight is used to measure the "unprotectability" of the network. For a given routing tree T, this weight is denoted by $\Gamma(T)$.

The objective if the invention is to provide high network protection. Hence what is desired in an embodiment is a routing algorithm characteristic that minimizes the weight, meaning that the probability that a node is disconnected from the controller in case of a failure in the network is minimized.

Either one of the two algorithms (MR, RASP) disclosed herein can be used within the invention, depending on the objective, to construct a routing tree for the control traffic in a split architecture system. The MR algorithm results in a controller routing tree having higher resilience as it is not confined only to the set of shortest-path trees, but doesn't provide a shortest-path tree. The RASP algorithm can be used as an alternative algorithm when a shortest primary path is desired between the controller and a switch. Comparing the MR and RASP algorithms, the MR algorithm results in better resilience compared to the RASP algorithm as the MR algorithm doesn't confine itself to the set of shortest-path trees only. The RASP algorithm, however, results in shorter paths between switches and the controller.

The first algorithm used in the invention is an approximation algorithm for finding the controller routing tree that provides maximum resilience in the network. The algorithm is referred to herein as the Maximum Resilience (MR) algorithm. As described herein, calculating the optimal tree which maximizes the protection is an NP-hard problem. Therefore, the heuristic MR algorithm is an approximation algorithm, which selects a shortest-path tree as a starting point and modifies the tree in order to improve resilience. The output of the MR algorithm is not necessarily a shortest-path tree, but provides more resilience compared to the initial tree.

Referring to the MR algorithm, for a given controller location, finding the best routing tree that maximizes the protection of the network, that is one that minimizes $\Gamma(T)$, can be shown to be an NP-hard problem which means that there is no known polynomial-time algorithm to find the best tree among all possible ones. Therefore, an approximation algorithm must be used for a sub-optimal solution.

Assuming no possibility of link or node failures in a network, only primary paths are needed for routing and in that circumstance a shortest-path tree provides best performance. However, because there is always a probability of failure, what is desired is a protection-improved routing algorithm policy. The MR algorithm is a heuristic algorithm for building the controller routing tree, which starts from the shortest-path tree and converges to a routing tree that provides resilience to the network. Over a number of iterations, the MR algorithm improves resilience by changing the edges of the controller routing tree, until no further improvement is obtainable. The controller routing tree constructed using the MR algorithm is referred to as the Max_Resilience_RT tree in the pseudo-code provided in Table 1.

Figure 5:
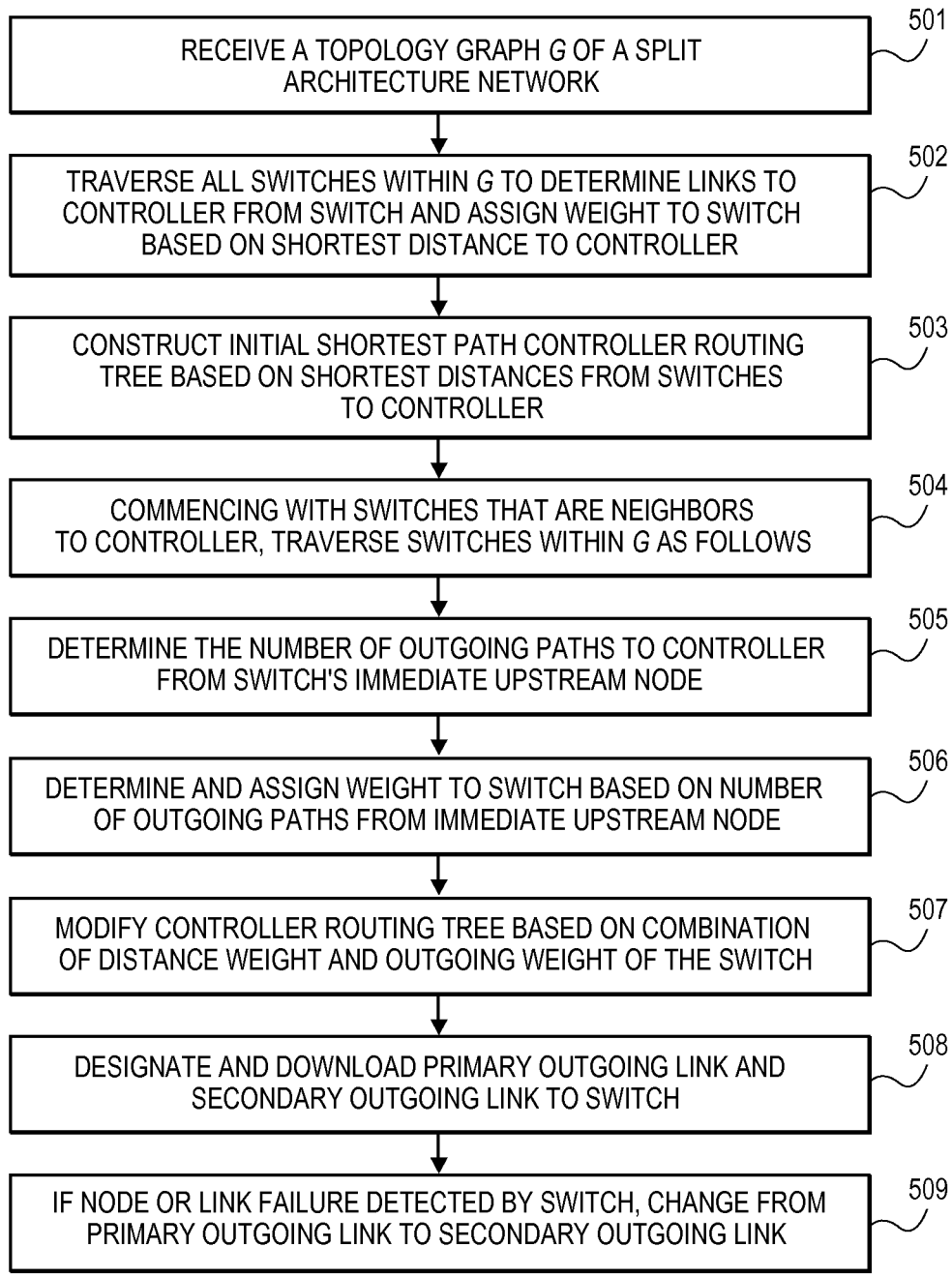
FIG. 5 is a flow chart of an embodiment of a first routing algorithm of the present invention.

This MR algorithm is described in relation to the flowchart of FIG. 5. Prior to performing the algorithm, the node having controller functionality is assigned as the controller and the other nodes are assigned as switches in G. The MR algorithm is initiated by a controller routing tree module in a network topology design system in response to receiving the topological graph G of the split architecture network from a topology graphing module (Block 501). The process then starts to iterate through each of the switches in the graph (Block 502).

For each switch in the graph, a controller routing tree is generated with the controller serving as the root of the tree (Block 502). Then for each of these controller routing trees, the switches within these trees are traversed beginning with the switches that are neighbors to the controller (Block 503). Each node is given an initial weight based on its distance from the controller. This serves as a weight for the calculation of the overall routing tree weight. For each switch in each routing tree a determination of protection or resilience for a switch is then made by determining the distance of number of outgoing paths to the controller from its immediate upstream neighbor (Block 505, 506).

Through an iterative process of examining each switch as the algorithm progresses, each switch upstream of the switch being examined are also examined to determine if such upstream switch has multiple outgoing edges, and hence is more resilient than a switch having a single or lesser outgoing edges. This algorithm is performed until all of the nodes in the graph have been traversed and examined (Block 507). The switch that is immediately upstream and that has more resilience is selected as the primary outgoing link for the switch (Block 508) If a node or link failure is detected on that primary outgoing link, the switch will change to the secondary outgoing link (Block 509)

Pseudo-code implementing the MR algorithm is set forth in Table 1:

TABLE 1

MR algorithm in psuedo-code
Algorithm 1

```
procedure                Max_Resilience_RT(G.controller_loc)
  1:  T ← shortest-path tree
  2:  i ← 1
  3:  repeat
  4:     for nodes v with v.distance = i do
  5:        if v is the only node with v.distance = i then
  6:           next:
  7:        end if
  8:        for every node u ∈ V \ {downstream nodes of v}
              and (v, u) ∈ E and (v, u) ∉ T do
  9:           if u.distance ≤ v.distance then
 10:              T'(u) ← tree built by replacing (v. upstream
                   node of v in T) by (v, u)
 11:              if Γ (T') < Γ (T) then
 12:                 replace T by T'
 13:              end if
 14:           end if
 15:        end for
 16:     end for
 17:     i ← i + 1
 18:  until all nodes checked
```

As seen in Table 1, v.distance is the distance, meaning the number of edges, between node v and the controller in T. The MR algorithm starts with the neighbors of the controller and determines if any improvements can be achieved by assigning a different upstream node to any of them. This is continued by checking all other nodes in the network. Note that because, in each iteration of the MR algorithm, the algorithm moves one step away from the controller no loops are formed in the routing tree.

An advantage of the MR algorithm is that it provides a local optimal solution for resilience optimization. However, however, the advantage has a less consequential trade-off in that the updates in line 10 of Table 1 may result in a longer path. Therefore, the final routing tree may not be a shortest-path tree.

The second algorithm used in the invention is a resilience-aware shortest path routing algorithm. This algorithm is referred to herein as the Resilience Aware Shortest Path (RASP) algorithm. The RASP algorithm has the objective of constructing a shortest-path tree, however, if there are multiple equal-length shortest-path trees, the algorithm determines which shortest-path tree has the greatest resilience compared to other shortest-path trees. The RASP algorithm first determines all possible shortest-path trees using the conventional Bellman-Ford algorithm. In converging to the final controller routing tree, the algorithm considers the resilience factor if there are multiple equal-length shortest-path trees, favoring as the controller routing tree that provides higher resilience.

The RASP algorithm provides a shortest-path tree with improved network resilience compared to other possible shortest-path trees. The RASP algorithm, however, does not necessarily result in an optimally resilient network.

Figure 6:
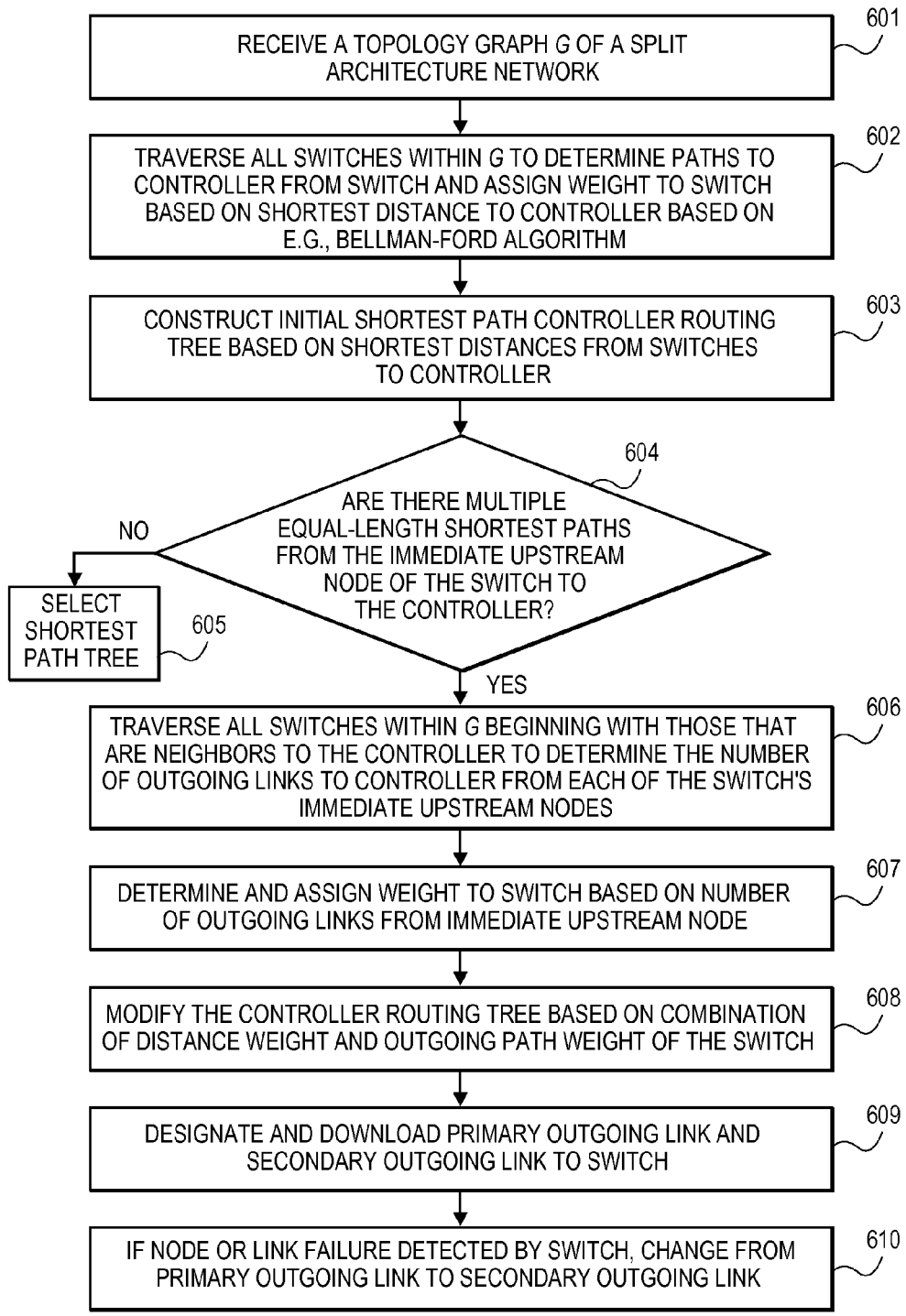
FIG. 6 is a flow chart of a an embodiment of a second routing algorithm of the present invention.

Prior to performing the RASP algorithm, the node having controller functionality is assigned as the controller and the other nodes are assigned as switches in G. As seen in the flow chart of FIG. 6, the RASP algorithm initially uses a Bellman-Ford algorithm to obtain an initial routing tree and then iteratively modifies the controller routing tree. The RASP algorithm is initiated by the controller routing tree module in response to receiving a topological graph of the split architecture network from the topology graphing module (Block 601). Then shortest-path tree(s) are developed for each switch based, e.g., on the Bellman-Ford algorithm (Blocks 602 and 603). The RASP algorithm determines if there are multiple equal-length paths to the controller (Block 604). If not, meaning there is a single shortest-path from each switch to the controller, the RASP algorithm then selects that shortest path for use in constructing the controller routing tree (Block 605). If there are multiple equal-length shortest-paths, the RASP algorithm then selects as each path for the controller routing tree, the shortest-path having greater resilience (Blocks 606-608).

To determine which shortest-path controller routing tree has the greater resilience, the switches are traversed beginning with the switches that are neighbors to the controller (Block 606). For each switch in each routing tree a determination of protection or resilience for a switch is made by reviewing the distance of number of outgoing paths to the controller from its immediate upstream neighbor (Block 607). Each node is given an outgoing path weight (degree).

Through an iterative process of examining each switch as the algorithm progresses, all switches are examined to determine the extent to which all such upstream switches have multiple outgoing links (edges), and hence comprise a more resilient path. The switches on the more resilient path are selected as the primary links to the controller and the backup links are stored in the switch as backup links (Block 609). If there is a node or link failure between the switch and controller on the primary path to the controller, then the switch changes from the primary outgoing link to the secondary outgoing link (Block 610).

Pseudo-code implementing the RASP algorithm is set forth in Table 2:

TABLE 2

RASP algorithm in pseudo-code
Algorithm 2 procedure Resilience_Aware_SP(G.controller_loc)

```
 1:    for every node v in G do
 2:        if v ≠ controller then
 3:            v.distance = ∞
 4:            v.parent = Ø
 5:            v.children = 0
 6:        else if v = controller then
 7:            v.distance = 0
 8:            v. parent = Ø
 9:            v.children = controller'sneighbors
10:        end if
11:    end for
12:    for i = 1 to n do
13:        for u = 1 to n do
14:            for v = 1 to n do
15:                if u.distance > edge(u, v) + v.distance then
16:                    (u.parent).children − −
```

17: $$(u.parent).distance \mathrel{-}= \frac{1}{(u.parent).degree}$$

```
18:                    u.parent = v
19:                    u.distance = v.distance + edge(u, v)
```

20: $$v.distance \mathrel{+}= \frac{1}{v.degree}$$

```
21:                    v. children + +
22:                end if
23:            end for
24:        end for
25:    end for
```

As seen in Table 2, v.distance is the length of the path between node v and the controller, v.parent is the parent node of v along the path to the controller and edge.(u,v) is the weight of the edge between node u and node v. In normal cases, edge.(u,v)=1. The total number of nodes in the graph G is denoted by n. The RASP algorithm first initializes the distance and the parent for each node as seen in lines 2 to 9. The algorithm then iterates n times. Each time it iterates, it checks for every node u, as seen in line 15, if there is an improvement on the distance by connecting this node to its neighbor v. If there is an improvement, the RASP algorithm updates the node's parent and its distance to the controller as seen in lines 18 and 19. Note that the algorithm is modified by adding a new data structure: the children of each node v, which is denoted by v.children. In each iteration, in addition to the parent and distance fields, the algorithm also updates the children field. In order to improve resilience, for all the possible parents with same distance (that is, when a tie exists), the path with the highest resilience is selected. If a node has more edges, and fewer of them are in the selected routing tree, this node is presumed to be more protected—that is it has higher resiliency. This information is encoded into the distance as shown in line 20 of Table 2. The parent's distance is increased by 1/v.degree compared to its actual length. Note that since 1/v.degree is always less than 1, no matter how many times v.distance is increased, the total increases will always be smaller than 1. Because at least one of a node's neighbors presumably will be a parent, it means that if there exists another node v' whose path is 1 hop longer, it will still be longer than v's distance plus all the artificial increases. Therefore, the resultant routing tree is still a shortest path tree but whenever there is a tie amongst paths with equal distance, the routing tree selected will be the one with the most resilient path.

Figure 7:
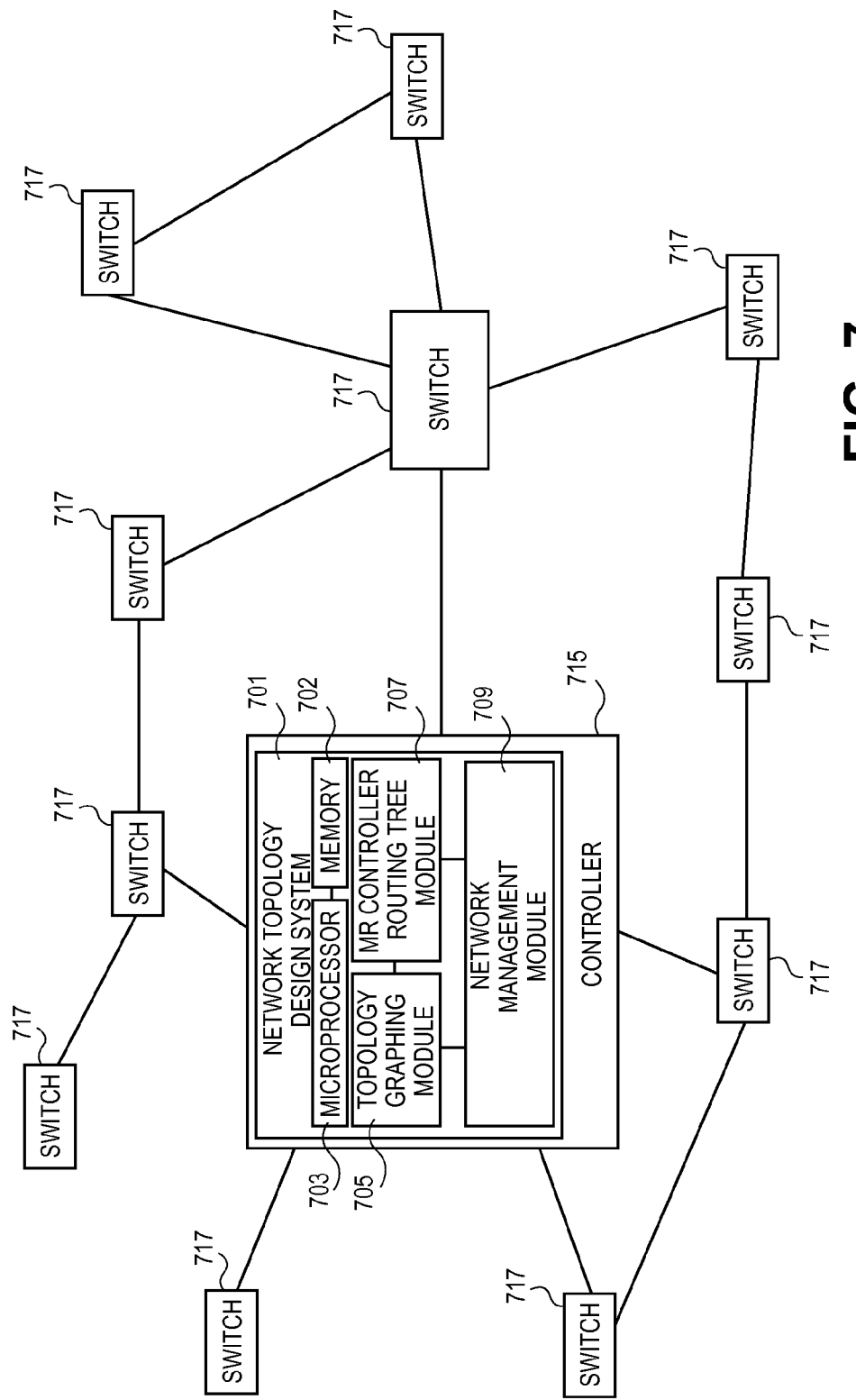
FIG. 7 is a block diagram of a network element configurable to implement the MR routing algorithm of the present invention.

FIG. 7 is a diagram of the MR embodiment of a design system within a controller coupled to a network. The diagram provides an illustration of an example network design system 701 to execute the network design system tool. The network design system 701 includes at least one non-transitory computer readable memory 702 to store instructions executed by at least one microprocessor 703, which coordinate the running of the components of the network design system tool including a topology graphing module 705, a controller routing tree module 707 and similar components. In other embodiments, any or all of these modules can be implemented as a set of hardware modules or devices. The microprocessor 703 can also execute a network management module 709 to communicate with and/or manage the split architecture network.

The topology graphing module 705 can convert a network topology into a representative graph and perform graphing functions on the representative graph to support the controller routing tree module 707. The controller routing tree module 707 operates on the graph generated by the topology graphing module 705 and direct its graphing operation to implement a controller routing tree according to the MR algorithm.

The network management module 709 can communicate with the controller routing tree module 707 and/or the topology graphing module 705 to discover the network topology for an automated process and/or to implement the routing tree algorithm in an automated process.

The illustrated split architecture network is an example implementation with either the MR or RASP algorithm. In the example, there is a controller 715 to control domain or split architecture area consisting of switches 717. The switches 717 are managed by the controller 715 using the MR controller routing tree.

Figure 8:
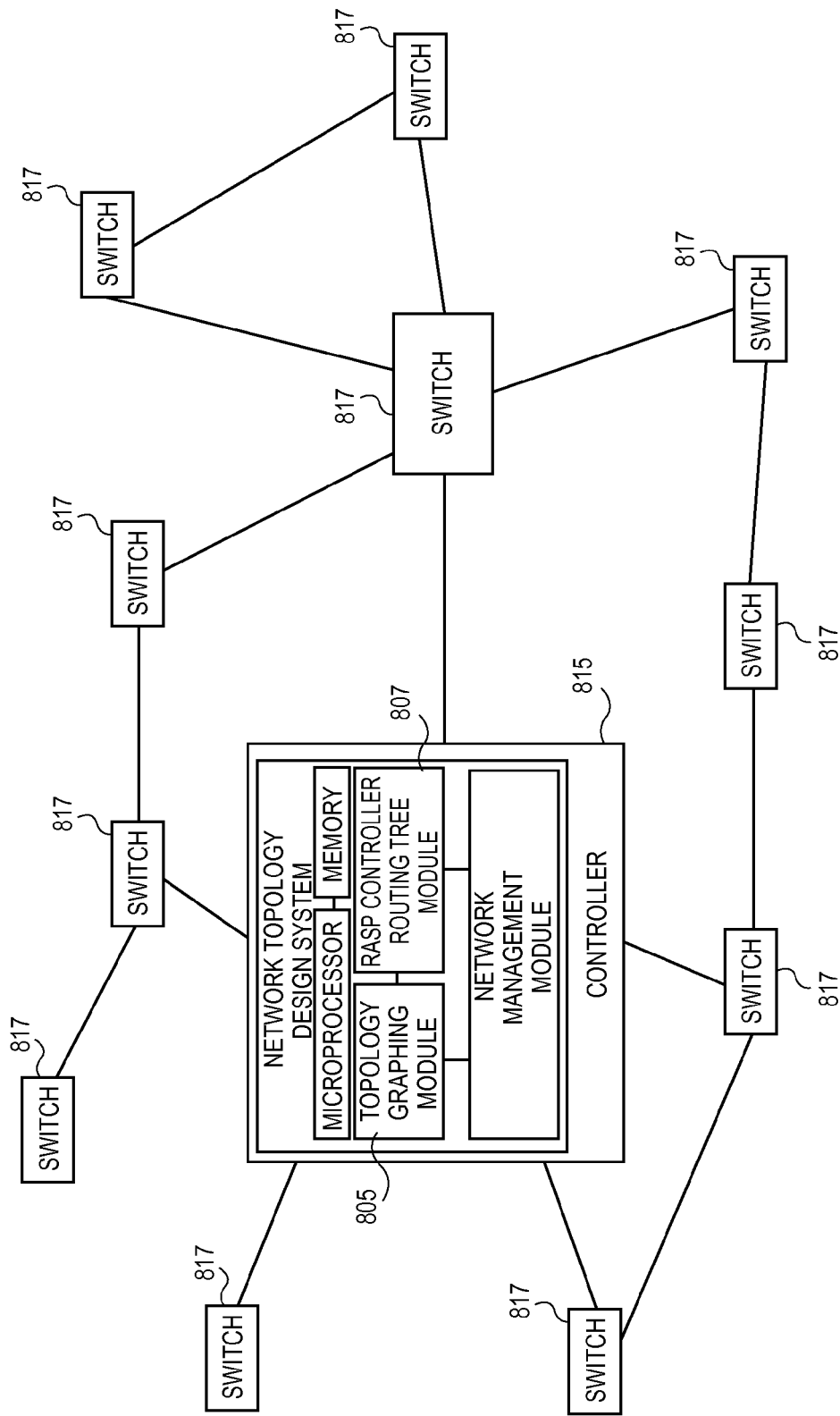
FIG. 8 is a block diagram of a network element configurable to implement the RASP routing algorithm of the present invention.

FIG. 8 is a diagram of the RASP embodiment of a design system within a controller 815 coupled to a network of switches 817. The arrangement of switches 817 and the components of controller 815 correspond similarly to those of FIG. 7, however, the controller routing tree module 807 operates on the graph generated by the topology graphing module 805 and direct its graphing operation to implement a controller routing tree according to the RASP algorithm.

After implementing the controller routing tree as determined by either the MR or RASP algorithm, when a switch detects a failure in its outgoing link or its immediate upstream node, it immediately changes its route to the controller, and uses the backup path, i.e., outgoing interface, pre-programmed in the switch to reconnect to the controller. This takes place without a need to involve the controller and without any effect on the rest of the routes in the network and on the connections of the downstream nodes to the controller. In other words, there will only be a local change in the outgoing interface of the affected switch. All other connections in the network will remain intact.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented by a network topology design system, the network topology design system including a controller having a microprocessor coupled to a non-transitory machine-readable or computer-readable storage media and operable as a controller routing tree module, the method to determine a controller routing tree T' for use within a split architecture network represented by network graph G, where control plane components are executed by the controller separate from data plane components executed by a plurality of switches, G=(V, E), where V is the set of nodes in the network, and E is the set of bidirectional edges between nodes traversing each switch to the controller, the controller routing tree T' representing a non-load balanced control traffic path between switches and the controller, the control traffic representing bi-directional information from each switch to the controller and forwarding decision information from the controller to the switch, the method comprising the steps of:
    graphing, by the network topology design system, all possible distances to the controller from each switch in G, each such the distance being comprised of a subset of E;
    based on all possible distances, determining a shortest-path to the controller for each such switch, all the shortest-paths from each switch to the controller comprising the shortest-path tree T for the controller;
    storing the shortest-path tree T in the non-transitory machine-readable or computer-readable storage media;
    based on the shortest-path to the controller for each switch, designating all immediate neighbor nodes of such switch in G as either upstream or downstream;
    commencing with the switch(es) that are neighbors to the controller and traversing to each immediate downstream switch until all of the switches in G are processed, determining and assigning, by the network topology design system, a weight for each switch in G;
    based on the weight assigned to each switch, modifying the shortest-path tree T to obtain a modified shortest-path tree T' with improved resilience; and
    storing the modified shortest-path tree T' in the non-transitory machine-readable or computer-readable storage media.

2. The method of claim 1, further comprising communicating to, and storing in, a non-transitory machine-readable or computer-readable storage media in each switch, an outgoing primary link and, as a backup, if any, at least one outgoing secondary link from the switch to an immediate upstream switch based on the paths from the switch to the controller in the shortest-path tree T'.

3. The method of claim 2, further comprising the steps of:
    detecting, by a switch, a failure in an upstream link or node;
    changing, by the switch, its route to the controller by changing the outgoing primary link to an outgoing secondary link, if any, serving as a backup.

4. The method of claim 1, wherein the step of graphing is implemented by administrator input, automated discovery processes or any combination thereof.

5. The method of claim 1, wherein the step of calculating and assigning, by the network topology design system, a weight for each switch in G, further comprises the steps of:
    calculating and assigning the weight to each switch in V based on whether such switch is protected from upstream node failures and link failures by determining the extent to which there is at least one different path to the controller over at least one outgoing secondary link;
    if there exists at least one different path using at least one outgoing secondary link, communicating from the controller to such switch the existence of the at least one outgoing secondary link; and
    configuring as a backup the at least one outgoing secondary link in such switch.

6. The method of claim 1, wherein the step of modifying the shortest-path tree T further comprises the steps of:
    determining at a first switch if any improvements to resilience of the split architecture network can be obtained by using a different path to the controller taking into account the weight of each other switch traversed to the controller from the first switch;
    determining at a second switch immediately downstream from the first switch, if any improvements to resilience can be obtained by using a different path from such second switch to the controller taking into account the weight of each switch traversed to the controller; and
    performing the foregoing determining steps at each switch in G until all switches in G have been processed.

7. The method of claim 1, wherein a greater weight is assigned to a switch closer to the controller as a consequence of it having a greater number of downstream switch(es).

8. The method of claim 1, wherein the weight assigned to a switch is proportional or fractional to the number of its downstream switch(es).

9. The method of claim 1, wherein the weight of a switch is based on the number of its downstream switch(es) as scaled by a cost factor assigned by a user.

10. The method of claim 9, wherein the cost factor is 0, if the switch is protected against both its outgoing link and its immediate upstream node failures; $\alpha$, if the switch is only protected against an outgoing link failure; $\beta$ if the switch is only protected against an immediate upstream node failure, otherwise $\alpha+\beta$.

11. The method of claim 10, further comprising the step of selecting as routing tree T', the routing tree having the minimum cumulative weight, hence minimizing the probability that a switch is disconnected from the controller in case of a link or node failure in the network.

12. A controller in a network with a split architecture, comprising:

a microprocessor coupled to a non-transitory machine-readable media and operable as a controller routing tree module to determine a controller routing tree T', the controller:

graphing all possible distances to the controller from each switch in G, each such the distance being comprised of a subset of E, wherein G=(V, E), where V is the set of nodes in the network, and E is the set of bidirectional edges between nodes traversing each switch to the controller;

based on all of the possible distances, determining a shortest-path to the controller for each switch in the network, all the shortest-paths from each switch to the controller comprising the shortest-path tree T for the controller;

storing the shortest-path tree T in the non-transitory machine-readable media;

based on the shortest-path to the controller for each switch, designating all immediate neighbor nodes of such switch in G as either upstream or downstream;

commencing with the switch(es) that are neighbors to the controller, traverse each immediately downstream switch until all of the switches in G are processed, so as to determine and assign, by the network topology design system, a weight for each switch in G;

based on the weight of each switch, modifying the shortest-path tree T to obtain a modified shortest-path tree T' with improved resilience; and storing the modified shortest-path tree T' in the non-transitory machine-readable or computer-readable storage media, said controller in combination with a switch, wherein the controller communicates to, and the switch stores in a non-transitory machine-readable media, an outgoing primary link and, as a backup, if any, at least one outgoing secondary link from the switch to an immediate upstream switch based on the paths from the switch to the controller in the shortest-path tree T' as determined by the controller routing tree module and further wherein the switch is configured to detect a failure in an upstream link or node and change, by the switch, its route to the controller by changing the outgoing primary link to an outgoing secondary link, if any, serving as a backup.

13. A method implemented by a network topology design system, the network topology design system including a controller having a microprocessor coupled to a non-transitory machine-readable or computer-readable storage media and operable as a controller routing tree module, the method to determine a controller routing tree T' for use within a split architecture network represented by network graph G, where control plane components are executed by the controller separate from data plane components executed by a plurality of switches, G=(V, E), where V is the set of nodes in the network, and E is the set of bidirectional edges between nodes traversing each switch to the controller, the controller routing tree T' representing a non-load balanced control traffic path between each switch and the controller, the control traffic representing bi-directional information from each switch to the controller and forwarding decision information from the controller to the switch, the method comprising the steps of:

graphing, by the network topology design system, all possible distances to the controller from each switch in G, each such the distance being comprised of a subset of E;

based on all of the possible distances, determining a shortest-path to the controller for each such switch, all of the shortest-paths from each switch to the controller comprising the shortest-path tree T for the controller;

storing the shortest-path tree T in the non-transitory machine-readable or computer-readable storage media;

based on the shortest-path to the controller for each switch, designating all immediate neighbor nodes of such switch in G as either upstream or downstream;

establishing an edge weight parameter for each link between each switch and each of the switches traversed along each path to the controller;

determining if there are more than one equal-length, shortest-paths between the controller and the switch;

if there is not more than one equal-length, shortest-path between the controller and the switch, selecting such shortest-path and storing it in the non-transitory machine-readable or computer-readable storage media; and if there is more than one equal-length, shortest-path from the switch to the controller, selecting as the shortest-path the path having the most resilience compared to the other shortest-paths and storing the selected shortest-path in the non-transitory machine-readable or computer-readable storage media.

14. The method of claim 13, further comprising calculating the initial shortest path tree(s) using a Bellman-Ford algorithm.

15. A controller in a network with a split architecture, comprising:

a microprocessor coupled to a non-transitory machine-readable media and operable as a controller routing tree module to determine a controller routing tree T', the controller:

graphing all possible distances to the controller from each switch in G, each such the distance being comprised of a subset of E, wherein G=(V, E), where V is the set of nodes in the network, and E is the set of bidirectional edges between nodes traversing each switch to the controller;

based on all of the possible distances, determining an initial shortest-path to the controller for each switch in the network, all the shortest-paths from each switch to the controller comprising the shortest-path tree T for the controller;

storing the shortest-path tree T in the non-transitory machine-readable media;

based on the shortest-path to the controller for each switch, designating all immediate neighbor nodes of such switch in G as either upstream or downstream;

establishing an edge weight parameter for each link between each switch and each of the switches traversed along each path to the controller;

determining if there are more than one equal-length, shortest-paths between the controller and the switch;

if there is not more than one equal-length, shortest-path between the controller and the switch, select such shortest-path and storing it in the non-transitory machine-readable media; and if there is more than one equal-length, shortest-path from the switch to the controller, selecting as the shortest-path the one having the most resilience compared to the other shortest-paths; and storing the selected shortest-path in the non-transitory machine-readable media, said controller in combination with a switch, wherein the controller communicates to, and the switch stores in a non-transitory machine-readable media, an outgoing primary link and, as a backup, if any, at least one outgoing secondary link from the switch to an immediate upstream switch based on the paths from the switch to the controller in the shortest-path tree as determined by the controller routing tree module;

wherein the switch is configured to detect a failure in an upstream link or node; and change, by the switch, its path to the controller by changing the outgoing primary link to an outgoing secondary link, if any, serving as a backup.

* * * * *